United States Patent
Friedman et al.

(10) Patent No.: US 9,389,960 B2
(45) Date of Patent: *Jul. 12, 2016

(54) RECOVERING FROM A DEFECTIVE BOOT IMAGE

(71) Applicant: INTERNATIONAL BUSINESS MACHINES CORPORATION, Armonk, NY (US)

(72) Inventors: Alex Friedman, Herzliya (IL); Constantine Gavrilov, Rishon-le-Zion (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/873,491

(22) Filed: Oct. 2, 2015

(65) Prior Publication Data

US 2016/0026532 A1  Jan. 28, 2016

Related U.S. Application Data

(63) Continuation of application No. 14/074,409, filed on Nov. 7, 2013, now Pat. No. 9,218,250, which is a continuation of application No. 13/829,906, filed on Mar. 14, 2013, now Pat. No. 9,218,248.

(51) Int. Cl.
*G06F 9/24* (2006.01)
*G06F 11/14* (2006.01)
(Continued)

(52) U.S. Cl.
CPC .......... *G06F 11/1417* (2013.01); *G06F 9/4401* (2013.01); *G06F 11/0793* (2013.01); *G06F 11/1435* (2013.01); *G06F 11/1438* (2013.01); *G06F 11/1451* (2013.01); *G06F 11/1464* (2013.01); *G06F 11/2058* (2013.01); *G06F 11/2069* (2013.01); *G06F 3/0683* (2013.01); (Continued)

(58) Field of Classification Search
CPC .............. G06F 3/0683; G06F 11/1458; G06F 11/1469; G06F 11/3419
USPC .................................................. 713/1, 2, 100
See application file for complete search history.

(56) References Cited

U.S. PATENT DOCUMENTS

| | | | |
|---|---|---|---|
| 7,516,319 B2 | 4/2009 | Chen | |
| 7,546,449 B2 | 6/2009 | Wu | |

(Continued)

FOREIGN PATENT DOCUMENTS

EP      1764687 B1      3/2010

OTHER PUBLICATIONS

Lin Tao et al., "Implementation of Linux in embedded system," Control & Automation No. 7: 27-149, 2005.

*Primary Examiner* — Michael J Brown
(74) *Attorney, Agent, or Firm* — Griffiths & Seaton PLLC

(57) ABSTRACT

Methods, apparatus and computer program products implement embodiments of the present invention that include detecting, by a first computer having a first memory, a software stack in a second memory of a second computer coupled to the first computer via a network. The software stack is copied from the second memory to the first memory, and the copied software stack is executed by the first computer. Prior to copying the software stack an error is detected in a boot image stored on a boot device for the first computer by identifying an invalid signature for the boot image.

15 Claims, 3 Drawing Sheets

(51) Int. Cl.
*G06F 15/177* (2006.01)
*G06F 11/07* (2006.01)
*G06F 9/44* (2006.01)
*G06F 11/20* (2006.01)
*G06F 3/06* (2006.01)
*G06F 11/34* (2006.01)

(52) U.S. Cl.
CPC ......... *G06F 11/1458* (2013.01); *G06F 11/1469* (2013.01); *G06F 11/3419* (2013.01); *G06F 2201/84* (2013.01)

(56) References Cited

U.S. PATENT DOCUMENTS

| | | | |
|---|---|---|---|
| 7,546,450 | B2 | 6/2009 | Danielsen |
| 7,594,068 | B2 | 9/2009 | Diehl |
| 7,650,490 | B2 | 1/2010 | Barron, Jr. et al. |
| 7,949,814 | B2 | 5/2011 | Chan |
| 9,218,248 | B2 | 12/2015 | Friedman et al. |
| 9,218,250 | B2 * | 12/2015 | Friedman ............ G06F 11/1417 |
| 2004/0073783 | A1 | 4/2004 | Ritchie |
| 2009/0150598 | A1 | 6/2009 | Jung et al. |
| 2010/0058041 | A1 | 3/2010 | John et al. |

* cited by examiner

RECOVERING FROM A DEFECTIVE BOOT IMAGE

CROSS-REFERENCE TO RELATED APPLICATIONS

This Application is a Continuation of U.S. patent application Ser. No. 13/829,906, filed on Mar. 14, 2013, and is related to U.S. patent application Ser. Nos. 13/829,612, 13/830,019, 13/830,081, and 13/830,153, each filed Mar. 14, 2013, all of which are incorporated herein by reference.

FIELD OF THE INVENTION

The present invention relates generally to computer systems, and specifically to recovering from a defective boot image.

BACKGROUND

Operating systems manage the way software applications utilize the hardware of computer systems, such as storage controllers. A fundamental component of operating systems is the operating system kernel (also referred to herein as a "kernel"), which provides secure computer system hardware access to software applications executing on the computer system. Since accessing the hardware can be complex, kernels may implement a set of hardware abstractions to provide a clean and uniform interface to the underlying hardware. The abstractions provided by the kernel provide software developers easier access to the hardware when writing software applications.

Two common techniques for rebooting (i.e. restarting) an operating system are a "cold boot" and a "warm boot". During a cold boot, power to a computer system's volatile memory is cycled (i.e., turned off and then turned on), and the operating system is rebooted. Since power is cut off to the memory, any contents (i.e., software applications and data) stored in the memory prior to the cold boot are lost. During a warm boot, the operating system reboots while power is still applied to the volatile memory, thereby enabling the computer to skip some hardware initializations and resets. Additionally, during a warm boot the memory may be reset.

In addition to a warm boot and a cold boot, the Linux operating system offers a method of rapidly booting a new operating system kernel via the kexec function. The kexec function first loads a new kernel into memory and then immediately starts executing the new kernel. Using kexec to boot a new kernel is referred to a "hot" boot/reboot, since the computer's memory is not reset during the boot.

The description above is presented as a general overview of related art in this field and should not be construed as an admission that any of the information it contains constitutes prior art against the present patent application.

SUMMARY

There is provided, in accordance with an embodiment of the present invention a method, including detecting, by a first computer having a first memory, a software stack in a second memory of a second computer coupled to the first computer via a network, copying the software stack from the second memory to the first memory, executing, by the first computer, the copied software stack, and detecting, prior to copying the software stack, an error in a boot image stored on a boot device for the first computer; wherein detecting the error comprises identifying an invalid signature for the boot image.

There is also provided, in accordance with an embodiment of the present invention a storage system, including a first memory, and a processor coupled to the first memory, and configured to detect a software stack in a second memory coupled to the first processor via a network, to copy the software stack from the second memory to the first memory, to execute the copied software stack, and to detect, prior to copying the software stack, an error in a boot image stored on a boot device for the first computer, wherein detecting the error comprises identifying an invalid signature for the boot image.

There is further provided, in accordance with an embodiment of the present invention a computer program product, the computer program product including a non-transitory computer readable storage medium having computer readable program code embodied therewith, the computer readable program code including computer readable program code executing on a first computer having a first memory and configured to detect a software stack in a second memory of a second computer coupled to the first computer via a network, computer readable program code configured to copy the software stack from the second memory to the first memory, computer readable program code configured to execute, by the first computer, the copied software stack, and computer readable program code configured to detect, prior to copying the software stack, an error in a boot image stored on a boot device for the first computer; wherein detecting the error comprises identifying an invalid signature for the boot image.

BRIEF DESCRIPTION OF THE DRAWINGS

The disclosure is herein described, by way of example only, with reference to the accompanying drawings, wherein.

DETAILED DESCRIPTION OF EMBODIMENTS

In computing, a boot comprises an initial set of operations that a computer performs when electrical power is switched on (also referred to as power cycling). During a boot, a computer may load software components such as an operating system kernel, services and applications. The software components that are loaded during a boot are typically stored in a system startup configuration file. For example, during a boot, a computer configured as a storage system may load a Linux operating system kernel, a network TCP/IP service and a storage application configured to process input/output (I/O) requests received from one or more host computers.

Software components that are loaded during a boot can be stored on a boot device as a boot image. When a computer system boots, the boot image is retrieved and stored in memory as a software stack. In other words, a loaded software stack may comprise an in-memory representation of a corresponding boot image on a boot device.

In a computer network coupling a first computer to a second computer, there may be instances when power is cycled to the first computer, and the first computer detects a defective boot image (i.e., an error in the boot image) while attempting to boot. For example, the computer may identify an invalid signature (i.e., a checksum) for regions storing the boot image. Embodiments of the present invention provide methods and systems for the first computer to recover from the defective boot image. In some embodiments, upon detecting a defective boot image and detecting the second computer executing a software stack, the first computer can retrieve the software stack from the second computer's memory and start executing the retrieved software stack.

While the embodiments described herein relate generally to a storage system such as clustered storage controller, it will be understood that embodiments of the present invention may also be used for other types of networked computer systems.

Figure 1:
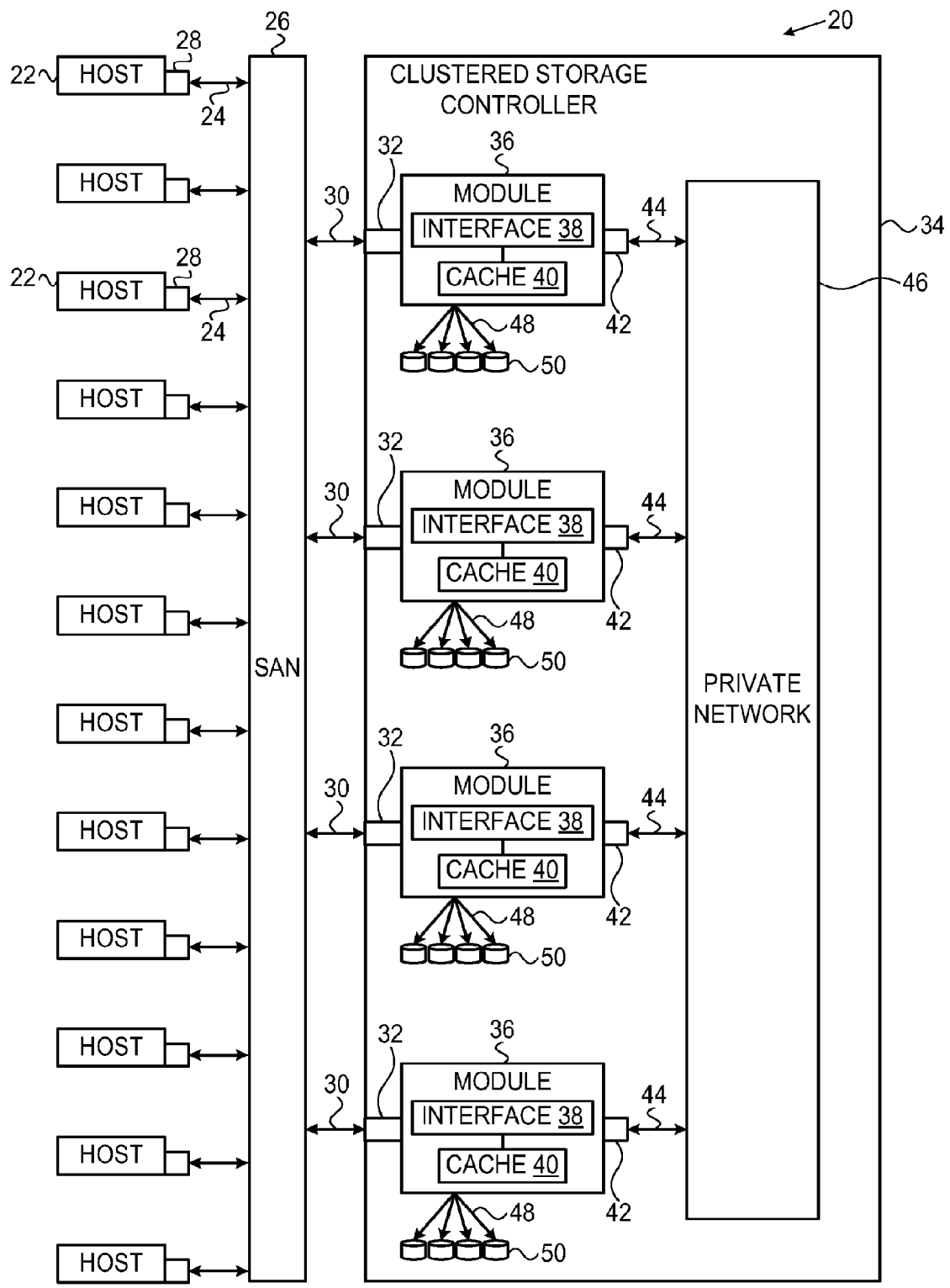
FIG. 1 is a block diagram that schematically illustrates a storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/actions specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the functions/actions specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/actions specified in the flowchart and/or block diagram block or blocks.

Remote Boot Image Retrieval

Figure 2:
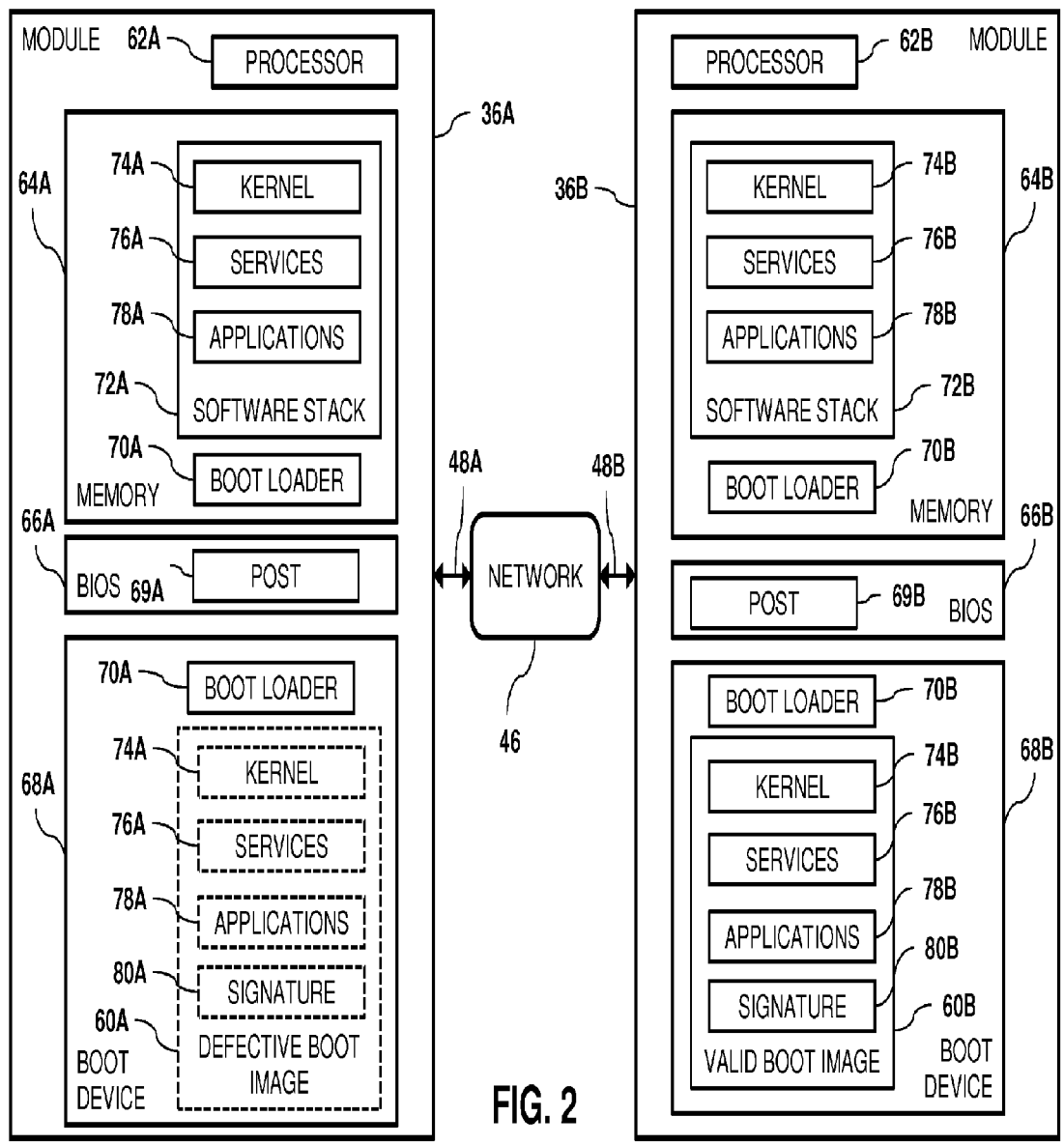
FIG. 2 is a block diagram of a module of the storage system configured to recover from a defective boot image, in accordance with an embodiment of the present invention.

FIG. 2 is a block diagram of modules 36 configured to recover from a boot image 60 that is determined to be defective, in accordance with an embodiment of the present invention. In the description herein, modules 36 and their respective components may be differentiated by appending a letter to the identifying numeral, so that modules 36 comprise a first module 36A and a second module 36B. Alternatively a given module 36 may just be referred to as module 36.

Module 36 comprises a processor 62, a memory 64, a Basic Input Output System (BIOS) 66 and a boot device 68. In embodiments of the present invention, boot device 68 may comprises a storage device such as a hard disk, an optical disk or a solid state drive (SSD). In the configuration shown in FIG. 2, boot device 68A stores a defective boot image 60A and boot device 68B stores a valid (i.e., non-defective) boot image 60B.

BIOS 66 typically comprises a non-volatile memory configured to initially store power-on self-test (POST) procedures 69. When power is cycled to module 36, processor 62 can execute POST procedures 69 and load a boot loader 70 from boot device 68 to memory 64. Boot loader 70 is typically stored on a master boot record of boot device 68. When started, boot loader 70 can be configured to load components of boot image 60 to a software stack 72 in memory 64.

Boot image 60 comprises an initial set of components that processor 62 executes when power is cycled to module 36. In the example shown in FIG. 2, boot image 60 comprises a kernel 74, one or more services 76 and one or more applications 78. When booting module 36, processor 62 loads boot image 60 to a software stack 72 in memory 64, and starts executing kernel 74, services 76 and applications 78 from the software stack in memory 64.

Boot image 60 may also comprise a signature 80 (also called a data integrity field or DIF) that may comprise a checksum calculation performed on regions (i.e., blocks or segments) of boot device 68 storing boot image 60. Signature 80 can be used to identify data errors in boot image 60, particularly (but not exclusively) by boot loader 70.

In the embodiments described herein, a checksum calculated by processor 62A does not match signature 80A, and a checksum calculated by processor 62B matches signature 80B. Therefore, in the example shown in FIG. 2, boot image 60A has an invalid signature 80A, and is thus considered to be "defective". In contrast, boot image 60B has a valid signature 80B and is thus considered to be "valid".

Processor 62 typically comprises a general-purpose computer, which is programmed in software to carry out the functions described herein. The software may be downloaded to module 36 in electronic form, over a network, for example, or it may be provided on non-transitory tangible media, such as optical, magnetic or electronic memory media. Alternatively, some or all of the functions of processor 62 may be carried out by dedicated or programmable digital hardware components, or using a combination of hardware and software elements.

While the embodiments describe herein have software stack 72 comprising kernel 74, services 76 and applications 78, any organized collection comprising any number of components in memory 64 is considered to be within the spirit and scope of the present invention. For example, the collection (e.g., software stack 72) may comprise only kernel 74.

Figure 3:
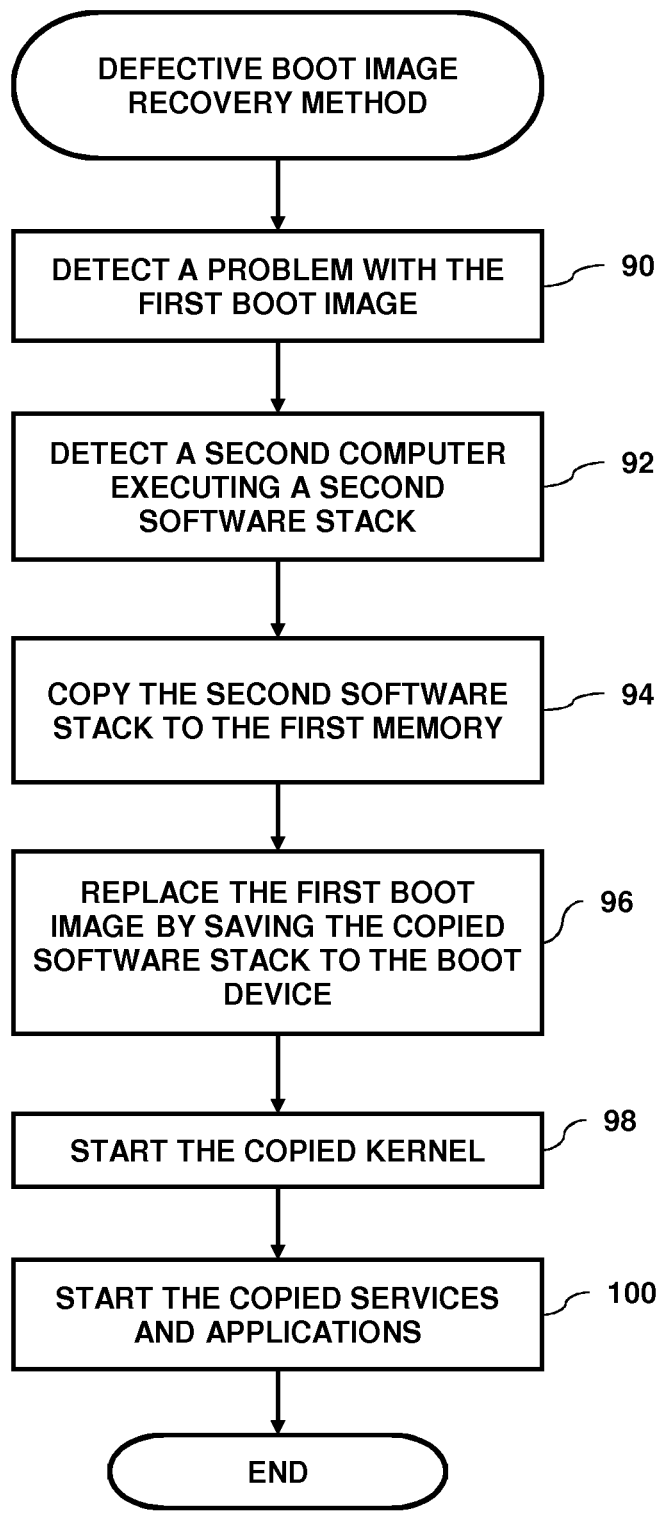
FIG. 3 is a flow diagram that schematically illustrates a method of recovering from the defective boot image, in accordance with an embodiment of the present invention.

FIG. 3 is a flow diagram that schematically illustrates a method for module 36A (also referred to herein as a first computer) to recover from defective boot image 60A, in accordance with an embodiment of the present invention. In an initial step 90, processor 62A executes boot loader 70A in order to retrieve boot image 60A, and detects a problem with the retrieved boot image. For example (as described supra), processor 62A can calculate a checksum on regions of boot device 68A storing boot image 60A, and detect that the calculated checksum does not match signature 80A.

In a detection step 92, processor 62A detects module 36B (also referred to herein as a second computer) that is coupled to module 36A via network 46 and is executing software stack 72B. In a copy step 94, processor 62A copies components (i.e., kernel 74B, services 76B and applications 78B) of software stack 72B from memory 64B to software stack 72A in memory 64A.

For example, in step 92, processor 62A can issue a broadcast over network 46, requesting a response from the other modules 36 in the storage controller. Any available modules can reply, using a first unicast transmission. Upon receiving the unicast transmissions, processor 62A can select module 36B (i.e., in the example shown in FIG. 2), via a second unicast transmission. Upon receiving the second unicast transmission, module 36B (i.e., the selected module can convey), using a third unicast transmission, software stack 64B to module 36A.

In some embodiments, boot loader 70A may be configured to perform detection step 92 and copy step 94. In alternative embodiments, kernel 74A, services 76A and applications 78A may be configured to perform the detection and the copy steps describe supra. For example, signature 80A may comprise separate signatures for kernel 74A, services 76A and applications 78A, and processor 62A may detect an error in services 76A and/or applications 78A. Therefore, processor 62A may successfully boot kernel 74A from boot device 68A, and subsequently copy services 76B and/or applications 78B from module 36B.

In some embodiments, components of software stack 72B can be transferred, via network 46, to memory 64A using remote direct memory access (RDMA), which typically has little or no performance impact on modules 36A and 36B. When using RDMA, processor 62A can directly access memory 64B to retrieve software stack 74B and stored the retrieved software stack to memory 64A.

In a replacement step 96, processor 62 replaces, on boot device 68A, the defective boot image with a new boot image 60A comprising the components of software stack 72A. Typically, replacement step 96 can be performed if the processor attempted to boot the defective boot image using a cold or a warm boot (i.e., loading the boot image from the boot device). In instances with the processor boots the defective boot image using a hot boot (e.g., kexec), the processor may skip step 96. Therefore, embodiments described herein can be used to recover from a defective boot image that was loaded via a cold boot, a warm boot or a hot boot.

In a boot step 98, processor 62 starts executing (i.e., boots) kernel 74A. Finally, in a start step 100, processor 62A starts executing services 76A and applications 78A, and the method ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method comprising:
    detecting, by a first computer having a first memory, a software stack in a second memory of a second computer coupled to the first computer via a network;
    copying the software stack from the second memory to the first memory;
    executing, by the first computer, the copied software stack; and
    detecting, prior to copying the software stack, an error in a boot image stored on a boot device for the first computer; wherein detecting the error comprises identifying an invalid signature for the boot image.

2. The method according to claim 1, wherein the software stack comprises one or more components that are selected from a list comprising an operating system kernel, a service, and a software application.

3. The method according to claim 1, wherein the boot device is selected from a list comprising a solid state drive, a hard disk and an optical disk.

4. The method according to claim 1, and comprising saving the copied software stack to a boot device coupled to the first computer.

5. The method according to claim 1, wherein copying the software stack comprises the first computer accessing, using remote direct memory access, the second memory, retrieving the software stack from the second memory, and storing the retrieved software stack to the first memory.

6. A computer, comprising:
a first memory; and
a processor coupled to the first memory, and configured to detect a software stack in a second memory coupled to the first processor via a network, to copy the software stack from the second memory to the first memory, to execute the copied software stack, and to detect, prior to copying the software stack, an error in a boot image stored on a boot device for the first computer, wherein detecting the error comprises identifying an invalid signature for the boot image.

7. The computer according to claim 6, wherein the software stack comprises one or more components that the processor is configured to select from a list comprising an operating system kernel, a service, and a software application.

8. The computer according to claim 6, wherein the processor is configured to select the boot device from a list comprising a solid state drive, a hard disk and an optical disk.

9. The computer according to claim 6, and comprising saving the copied software stack to a boot device coupled to the first computer.

10. The computer according to claim 6, wherein the processor is configured to copy the software stack by accessing, using remote direct memory access, the second memory, retrieving the software stack from the second memory, and storing the retrieved software stack to the first memory.

11. A computer program product, the computer program product comprising:
a non-transitory computer readable storage medium having computer readable program code embodied therewith, the computer readable program code comprising:
computer readable program code configured to detect, by a first computer having a first memory, a software stack in a second memory of a second computer coupled to the first computer via a network;
computer readable program code configured to copy the software stack from the second memory to the first memory;
computer readable program code configured to execute, by the first computer, the copied software stack; and
computer readable program code configured to detect, prior to copying the software stack, an error in a boot image stored on a boot device for the first computer; wherein detecting the error comprises identifying an invalid signature for the boot image.

12. The computer program product according to claim 11, and comprising computer readable program code that upon cycling power to the first computer, is configured to detect, prior to copying the software stack, an error in a boot image stored on a boot device for the first computer.

13. The computer program product according to claim 11, wherein the computer readable program is configured to select the boot device from a list comprising a solid state drive, a hard disk and an optical disk.

14. The computer program product according to claim 11, wherein the computer readable program is configured to save the copied software stack to a boot device coupled to the first computer.

15. The computer program product according to claim 11, wherein the computer readable program is configured to copy the software stack by the first computer accessing, using remote direct memory access, the second memory, retrieving the software stack from the second memory, and storing the retrieved software stack to the first memory.

* * * * *